Patented Jan. 11, 1949

2,459,063

UNITED STATES PATENT OFFICE 2,459,063

DIVALENT METAL SALTS OF HALOGEN SUBSTITUTED PHENYLOL SULFIDES

Elmer W. Cook, New York, N. Y., and Philip H. Moss, Stamford, Conn., assignors to American Cyanamid Company, New York, N. Y., a corporation of Maine No Drawing. Application May 9, 1946, Serial No. 668,457

3 Claims. (Cl. 260—429)

This invention relates to organic sulfides and disulfides, and relates more particularly to divalent metal salts of halogenated polyphenol sulfides and disulfides. The invention includes the novel compounds, their methods of preparation and their uses.

It is well known that many phenols possess valuable germicidal and fungicidal characteristics. Few phenol sulfides, however, have been tested as germicides. Probably the only previously known examples of such materials are the polychlorinated diphenol sulfides which have been proposed for use as germicidal agents in the form of the free phenols in soap compositions.

The present invention is directed to the preparation of divalent metal salts of various halogenated polyphenol sulfides and disulfides, containing from about 3 to about 10 or more phenol radicals and wherein the individual phenol radicals are connected by sulfur atoms. We have found that these compounds possess unusually high germicidal and fungicidal properties; in fact, the phenol coefficients of these salts are usually in excess of 400. The products may therefore be employed in the preparation of germicidal and fungicidal soap compositions, lotions, sprays, and the like materials wherein effective agents are required which are inherently incompatible with water, and are therefore resistant to removal thereby. The compounds of the invention are soluble in the more common organic solvents, with the exception of petroleum ether, and may be employed as organic solvent solutions if desired.

The divalent metal salts of halogenated polyphenol sulfides of the present invention are prepared by metathetical reaction between the corresponding alkali metal salts of halogenated polyphenol sulfides and water soluble salts of the desired divalent metals. The halogenated sulfides and alkali metal salts thereof are preferably prepared according to the method described in our copending application, Serial No. 668,456, filed on even date herewith.

According to the method of that application, various phenolic materials including p-cresol, p-chlorophenol, o-chlorophenol, dichlorophenol, and various short chain alkyl substituted phenols are condensed with sulfur chlorides to form polymers containing from 3 to 10 or more phenol radicals having the formula:

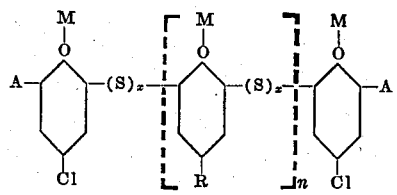

in which R may be halogen or a lower alkyl radical, A may be hydrogen or halogen, M may be either hydrogen or alkali metal, $x$ is 1 or 2, and $n$ is a whole number not greater than 8. The reactions are carried out, at atmospheric or superatmospheric pressures, at temperatures ranging from about 20° C. to about 100° C. or more, in the presence or absence of catalysts such as for example aluminum chloride, zinc chloride, or the like, for periods of time ranging from about 1 to about 7 hours. The phenol radicals of the polymers may all be chlorinated phenol radicals or they may be varied, as for example, the polymers may contain both chlorinated phenol groups and cresol groups, etc. In every instance, however, the para positions of the terminal phenol radicals of the polymers are halogen substituted, while the para positions of the intermediate phenol radicals may be halogen or alkyl substituted. Thus, for example, in a polymer containing 4 phenol radicals, the 2 intermediate phenol radicals may be methyl, ethyl, propyl, etc. substituted. These polymers are thereafter reacted with various alkali metal hydroxides to form their alkali metal salts.

The products of the present invention are prepared by methathetical reaction between the above described alkali metal salts of halogenated polyphenol sulfides and various water-soluble salts comprising sulfates, chlorides, nitrates, acetates, and the like salts of various divalent metals including zinc, copper, calcium, barium, mercury, iron, magnesium, and chromium. The reactions may be carried out at room temperatures and atmospheric pressures, although in some instances it may be advantageous to employ slightly increased temperatures or pressures to promote the reactions. The products are divalent metal salts of halogenated polyphenol sulfides having the general formula:

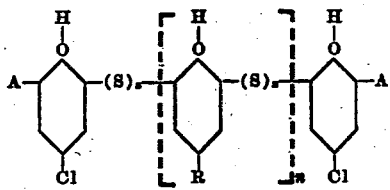

wherein A may be hydrogen or halogen, R may be halogen or lower alkyl, $x$ is 1 or 2, and $n$ is a whole number not greater than 8. It has been found that the germicidal and fungicidal properties of the compounds are improved when the ortho positions of the phenol radicals are halogen substituted. All of the products are insoluble in water, dilute aqueous alkali, but soluble in most of the ordinary organic solvents except petroleum ether.

The metathetical reactions of this invention may be carried out in aqueous solution by employing, in most instances, stoichiometric quantities of the alkali metal salts of halogenated polyphenol sulfides and the desired divalent metal salts, although if desired an excess of the divalent metal salts may be used, the excess being subsequently removed by washing the insoluble heavy metal phenolates with water. It has been shown by experimentation that one of the most desirable characteristics of the divalent metal salts of the present invention is their ability to prevent the growth of fungi such as *Aspergillus niger* and *Chaetomium globosum* on textiles, leathers, cork, and the like materials which have been impregnated with these compounds.

In order that the invention may be better understood by those skilled in the art the following examples are given, it being understood that the examples are given primarily for the purpose of illustration, the scope of the invention being defined by the appended claims.

Example 1

900 g. of p-chlorophenol was dissolved in 1 liter of ethylene dichloride and heated to boiling. Under reflux conditions 400 cc. of sulfur dichloride was slowly added. When the evolution of HCl ceased, indicating that the reaction was completed, the solvent and dissolved HCl were removed. A yield of 1050 g. of tris (p-chlorophenylol) sulfide was obtained. The product was tan colored, amorphous, and was soluble in ethylene dichloride, ether, chloroform, aqueous alkali, etc.

The product was dissolved in 635 g. of isopropanol and reacted with 290 g. of sodium hydroxide in 435 cc. of water. The final solution was homogeneous and remained clear on dilution with water.

2 gram mols of the sodium salt thus prepared was dissolved in 1 liter of water and reacted with 3 gram mols of copper sulfate. The precipitated divalent metal salt was filtered and washed with water, resulting in a product which was insoluble in dilute aqueous alkali and petroleum ether.

Example 2

900 g. of p-chlorophenol was dissolved in 1 liter of ethylene dichloride and heated to boiling. Under reflux conditions 400 cc. of sulfur monochloride was slowly added. After the evolution of HCl had ceased, indicating that the reaction was complete, the solvent and dissolved HCl were removed. A yield of 1250 g. of tris (p-chlorophenylol) disulfide was obtained. The product was an amorphous, tan colored material which was soluble in ethylene dichloride, ether, chloroform, aqueous alkali, etc. The product was dissolved in 700 g. of isopropanol and reacted with 300 g. of sodium hydroxide in 450 cc. of water. The final solution was homogeneous and remained clear on dilution with water.

2 gram mols of the sodium salt thus prepared was dissolved in 1 liter of water and reacted with 3 gram mols of zinc chloride. The product, after having been washed with water to remove the sodium chloride formed during the reaction, was insoluble in dilute aqueous alkali, and petroleum ether, but appreciably soluble in benzene, chloroform, butanol, etc.

Example 3

128.5 g. of p-chlorophenol was reacted with 90 g. of sulfur dichloride in di-n-butyl ether, employing aluminum chloride as catalyst. The product, octa (p-chlorophenylol) sulfide, was vacuum dried without washing. The product was reacted with sodium hydroxide to prepare the sodium salt thereof. This salt was reacted with magnesium chloride in the proportion of 2 mols of the sodium salt of octa (p-chlorophenylol) sulfide to 5 mols of MgCl$_2$ in 2 liters of water. The precipitated material was filtered and washed with water, the product being insoluble in dilute aqueous alkali, but soluble in the more commonly employed organic solvents.

Example 4

72 g. of bis (2-hydroxy-5-chlorophenyl) sulfide and 81.5 g. of 2,4-dichlorophenol were dissolved in a mixture of 300 cc. of di-n-butyl ether and 200 cc. of ethylene dichloride. 3 g. of aluminum chloride was employed as catalyst. 52 g. of sulfur dichloride was slowly added to the mixture at 70° C. After the evolution of hydrogen chloride had ceased, the solvents were removed in vacuo. The sodium salt of this compound was prepared by reacting the material with sodium hydroxide. The sodium salt was reacted with barium nitrate in the proportion of 2 mols of the sodium salt to 2 mols of barium nitrate, the reaction being carried out in water. The precipitated material was filtered and washed, and the product was insoluble in dilute aqueous alkali and the more common organic solvents.

What we claim is:

1. A salt of a halogenated polyphenol sulfide having the formula:

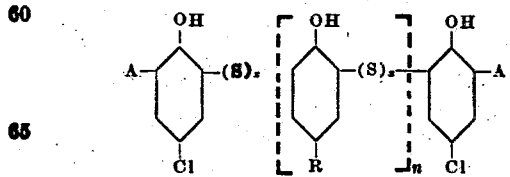

with a divalent metal of the group consisting of zinc, copper, calcium, barium, mercury, iron, and magnesium and wherein A is a member of the group consisting of hydrogen and halogen, R is a member of the group consisting of halogen and lower alkyl radicals, $x$ is a whole number not greater than 2, and $n$ is a whole number not greater than 8.

2. A copper salt of a phenol sulfide having the formula:
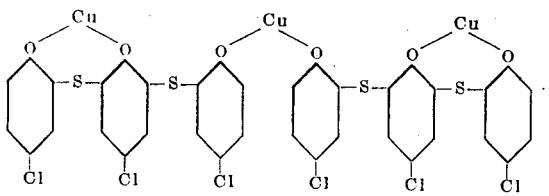
3. A zinc salt of a phenol sulfide having the formula:
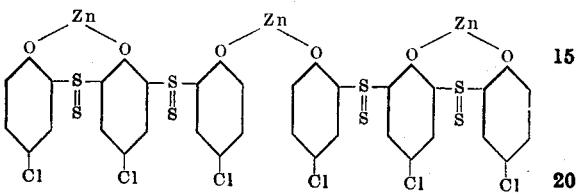
ELMER W. COOK.
PHILIP H. MOSS.
REFERENCES CITED
The following references are of record in the file of this patent:
UNITED STATES PATENTS
| Number | Name | Date |
| --- | --- | --- |
| 2,310,449 | Lightbaun et al. | Feb. 9, 1943 |
| 2,346,808 | Winning et al. | Apr. 18, 1944 |
| 2,362,289 | Mikeska | Nov. 7, 1944 |
| 2,362,292 | McNab | Nov. 7, 1944 |
| 2,366,873 | Reiff I | Jan. 9, 1945 |
| 2,366,874 | Reiff II | Jan. 9, 1945 |